US010735966B2

(12) United States Patent
Wu et al.

(10) Patent No.: US 10,735,966 B2
(45) Date of Patent: Aug. 4, 2020

(54) CLOUD ENROLLMENT INITIATION VIA SEPARATE DEVICE

(71) Applicant: General Electric Company, Schenectady, NY (US)

(72) Inventors: Jiaqi Wu, San Ramon, CA (US); Jesus Valenzuela, San Ramon, CA (US); Gregory Lammers, Dublin, CA (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 15/691,621

(22) Filed: Aug. 30, 2017

(65) Prior Publication Data

US 2019/0069178 A1 Feb. 28, 2019

(51) Int. Cl.
| | |
|---|---|
| H04L 12/24 | (2006.01) |
| H04W 12/08 | (2009.01) |
| H04L 29/08 | (2006.01) |
| H04L 12/28 | (2006.01) |
| H04L 29/06 | (2006.01) |
| H04W 12/00 | (2009.01) |
| H04W 12/06 | (2009.01) |

(Continued)

(52) U.S. Cl.
CPC .......... *H04W 12/08* (2013.01); *G06F 9/5072* (2013.01); *H04L 12/28* (2013.01); *H04L 41/0806* (2013.01); *H04L 63/06* (2013.01); *H04L 63/062* (2013.01); *H04L 63/08* (2013.01); *H04L 63/0876* (2013.01); *H04L 67/141* (2013.01); *H04L 67/34* (2013.01); *H04W 12/0023* (2019.01); *H04W 12/04031* (2019.01); *H04W 12/06* (2013.01); *H04L 41/22* (2013.01); *H04L 67/10* (2013.01); *H04L 67/12* (2013.01)

(58) Field of Classification Search
CPC .. H04W 12/06; H04W 12/08; H04L 63/0823; H04L 63/0861
See application file for complete search history.

(56) References Cited

U.S. PATENT DOCUMENTS

| | | | | |
|---|---|---|---|---|
| 2012/0252405 | A1* | 10/2012 | Lortz | ........................ G06F 8/60 455/410 |
| 2012/0254960 | A1* | 10/2012 | Lortz | .................... H04L 63/104 726/7 |

(Continued)

OTHER PUBLICATIONS

Wi-Fi Alliance, Wi-Fi Simple Configuration Protocol and Usability Best Practices for the Wi-Fi Protected Setup Program, Apr. 2011, Wi-Fi Alliance, Version 2.0.1.*

*Primary Examiner* — Ellen Tran
(74) *Attorney, Agent, or Firm* — Fitch Even Tabin & Flannery LLP

(57) ABSTRACT

Systems and methods for initiating enrollment of a local device in a cloud environment using a separate device are presented. In an example embodiment, a device identifier for the local device is received from the local device by a separate device that is trusted by a cloud computing system. The separate device causes the displaying of an indicator for the local device. In response to receiving an activation of the indicator for the local device, the separate device issues a request to the cloud computing system to receive credential information enabling the local device to enroll with the cloud computing system. The separate device receives the credential information from the cloud computing system and transmits the credential information to the local device.

19 Claims, 9 Drawing Sheets

(51) Int. Cl.
*G06F 9/50* (2006.01)
*H04W 12/04* (2009.01)

(56) References Cited

U.S. PATENT DOCUMENTS

| | | | |
|---|---|---|---|
| 2015/0215778 A1* | 7/2015 | Chin | H04W 8/005 |
| | | | 455/411 |
| 2016/0294828 A1* | 10/2016 | Zakaria | H04W 4/70 |
| 2017/0041271 A1* | 2/2017 | Tal | H04L 43/045 |

* cited by examiner

CLOUD ENROLLMENT INITIATION VIA SEPARATE DEVICE

TECHNICAL FIELD

Embodiments of the present disclosure relate generally to data processing and, more particularly, but not by way of limitation, to a method and system for initiating enrollment of a device with a cloud (e.g., Internet-based) system using a separate device.

BACKGROUND

Cloud computing systems may be provided on demand to one or more customers over a communication network (e.g., a wide area network, such as the Internet), thus relieving the customers of the responsibility of purchasing or leasing the underlying computing systems supporting the desired computing services. Further, in some operational environments, a cloud computing system may serve as a focal point for multiple, possibly numerous, client computing systems located remotely from the cloud computing system. Such a configuration may facilitate addition of the client computing systems to a larger distributed or collaborative system network, remote software provisioning of the client computing systems, operational management of the client computing systems, and so on.

While such a distributed computing system may facilitate a number of functions, such as sharing of information, that are beneficial to the individual client computing systems, overall system security may become a significant concern. For example, a malicious client computing system, by masquerading as a trusted client, may be able to access proprietary information stored in the cloud computing system. Moreover, by way of such access, a malicious actor may also be able to access and control one or more of the client computing systems communicatively coupled to the cloud computing system, thereby potentially causing improper operation of the client computing systems, as well as other systems connected thereto. Prior art systems do not adequately provide a mechanism for enrolling the client computing systems with the cloud computing system in an efficient and secure manner.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
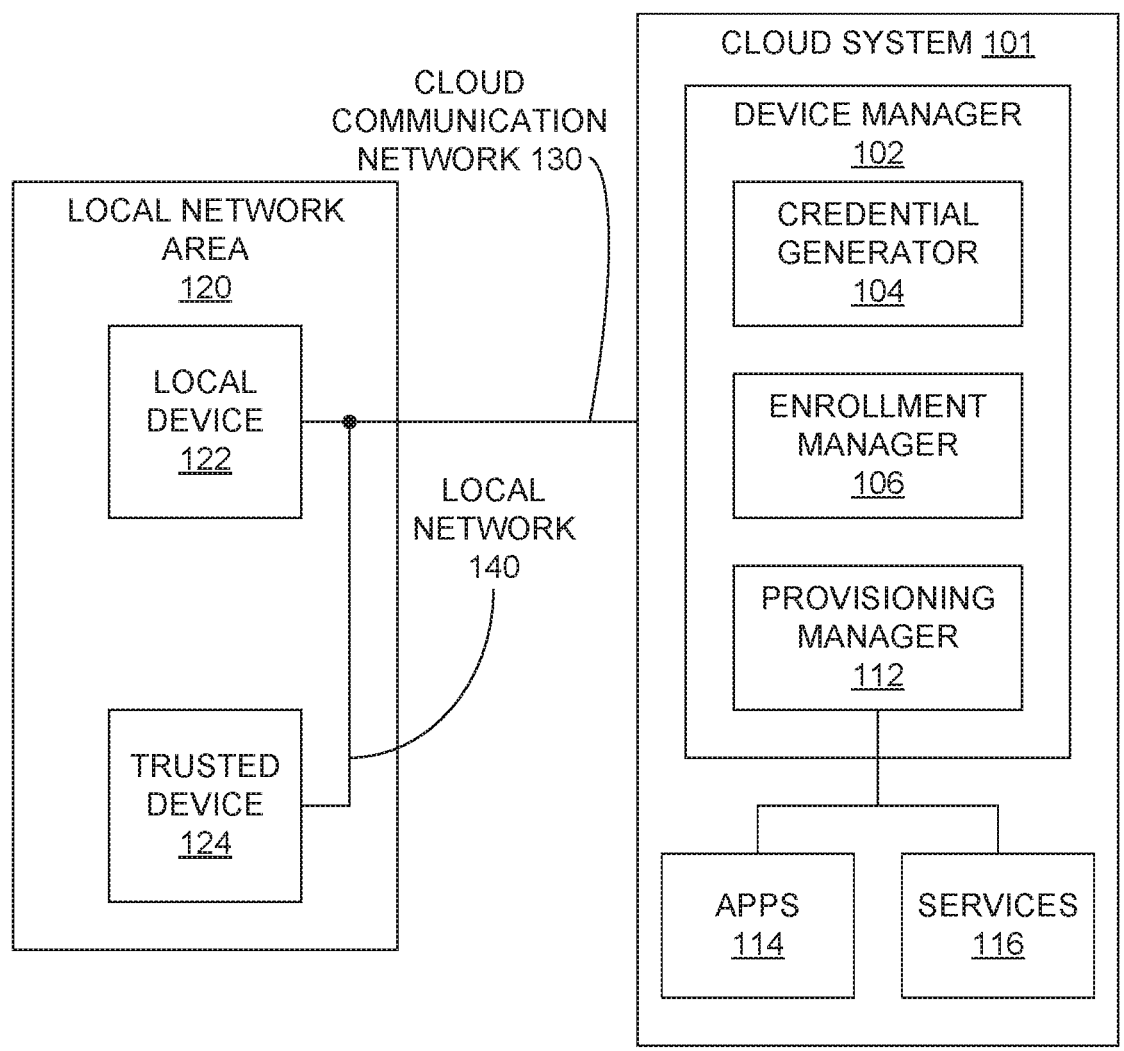
FIG. 1 is a block diagram of an example cloud computing system coupled to a local network area including an example trusted device and an example local device.

FIG. 1 is a block diagram of an example cloud computing system 101 (or, more simply, cloud system 101) coupled to a local network area 120 by way of a cloud communication network 130. Example embodiments of the cloud communication network 130 include, but are not limited to, a wide area network (WAN), such as the Internet, a wireless WAN (WWAN), and the like, and may be combined with other networks facilitating access to a WAN, such as a cellular telephone network (e.g., a third-generation (3G) or fourth-generation (4G) network). The local network area 120, such as a building or other localized site, may be served by one or more local networks 140 or connections. Example embodiments of a local network 140 include, but are not limited to, a local area network (LAN), a wireless LAN (WLAN), a power-line communication (PLC) network, a Bluetooth® connection, a near-field communication (NFC) connection, and so on.

As depicted in FIG. 1, the local network 140 may facilitate communication between a local device 122 and a trusted device 124 within the local network area 120. In some example embodiments, the local network 140 may also facilitate connection of the local device 122 and/or the trusted device 124 to the cloud communication network 130 for communication with the cloud system 101. For example, the local network 140 may include one or more routers, switches, or other devices that facilitate communication among the local device 122, the trusted device 124, and the cloud communication network 130. While a single local device 122 and a single trusted device 124 are depicted in FIG. 1, multiple numbers of each such device 122, 124 may be employed in the local network area 120 in other example embodiments.

In example embodiments, the trusted device 124 is a user-operated device separate from the local device 122 that is "trusted" by either or both of the local device 122 and the cloud system 101 for communications therewith. The trusted device 124 may be employed to gather information from the local device 122 via communication with the local device 122 over the local network 140, to communicate an intention to add the local device 122 to an overall system controlled via the cloud system 101, and to communicate credentials or similar information received from the cloud system 101 via the cloud communication network 130 to the local device 122 via the local network 140 to facilitate more direct communication thereafter between the local device 122 and the cloud system 101. In some example embodiments, that direct communication may facilitate the enrollment and provisioning of the local device 122 by the cloud system 101 to enable the local device 122 to perform some desired function or set of functions within the local network area 120. In an example embodiment, the communication of the credentials by the trusted device 124 to the local device 122 serves to initiate the enrollment and/or subsequent provisioning of the local device 122.

The trusted device 124 may include, but is not limited to, a desktop computer, a laptop computer, a tablet computer, a smart phone, or any other computing device or communication device capable of communicating with the cloud computing system 101 over the cloud communication network 130 via messages, data packets, or other communication data structures. In an example embodiment, the trusted device 124 may communicate with the cloud computing system 101 using Hypertext Transfer Protocol (HTTP) via a web server (not explicitly depicted in FIG. 1), using calls from an application executing on the trusted device 124 to an application programming interface (API) provided by the cloud system 101, or using other communication protocols or methods not specifically discussed herein. In some example embodiments, the trusted device 124 may be a tablet computer or smart phone that may communicate wirelessly via both the local network 140 and the cloud communication network 130 to display to a user of the trusted device 124 the identities of local devices 122 that are, or are not, provisioned for use with the cloud system 101, and to receive user selections of local devices 122 that are to be provisioned or de-provisioned.

The local device 122, in an example embodiment, may be any electronic device (including but not limited to computing systems such as desktop computers, laptop computers, and so on) capable of communicating with the trusted device 124 and the cloud system 101, as described above. In some example embodiments, the local device 122 may be an industrial "Internet of Things" (IIoT) device, such as an industrial controller, a data collection device (e.g., a device that measures temperature, pressure, fluid flow volume, fluid flow rate, force, etc.), or the like. Also in example embodiments, the local device 122 may be configured to include an operating system supporting multiple virtual machines, multiple software containers (e.g., Docker® containers), or other computer architectures supporting one or more execution processes and/or threads. The local device 122, in some example embodiments, may be configured to enroll with the cloud system 101 to facilitate further communications or operations in conjunction with the cloud system 101, possibly including the provisioning of software (e.g., software containers) to be installed on, and executed by, the local device 122. Also in some example embodiments, the local device 122 may communicate with the cloud system 101 to transfer data (e.g., measurements) between the local device 122 and the cloud system 101.

In the example embodiment shown in FIG. 1, the cloud computing system 101 includes one or more computer devices or systems implementing a device manager 102 configured to manage the use of one or more local devices 122. As depicted in FIG. 1, the device manager 102 may include a credential generator 104, an enrollment manager 106, and a provisioning manager 112. In example embodiments, the credential generator 104 may generate one or more credentials (e.g., a digital certificate, a secret (e.g., an encryption and/or decryption key), and/or the like) associated with a particular local device 122 (e.g., a local device 122 associated with an identifier provided by the trusted device 124). The enrollment manager 106, in an example embodiment, may be configured to enroll a local device 122 with the cloud system 101 to enable the local device 122 to access applications 114 and/or services 116 (e.g., a database, a file system, a messaging system, etc.) provided by software executing in the cloud system 101. Moreover, in some example embodiments, enrollment of the local device 122 may also allow the local device 122 to be provisioned by the provisioning manager 112 with executable software by the cloud system 101. In an example embodiment, the provisioning manager 112 may provision particular software based on an operational role (e.g., a role selected by a user of the trusted device 124) assigned to the local device 122.

Figure 2:
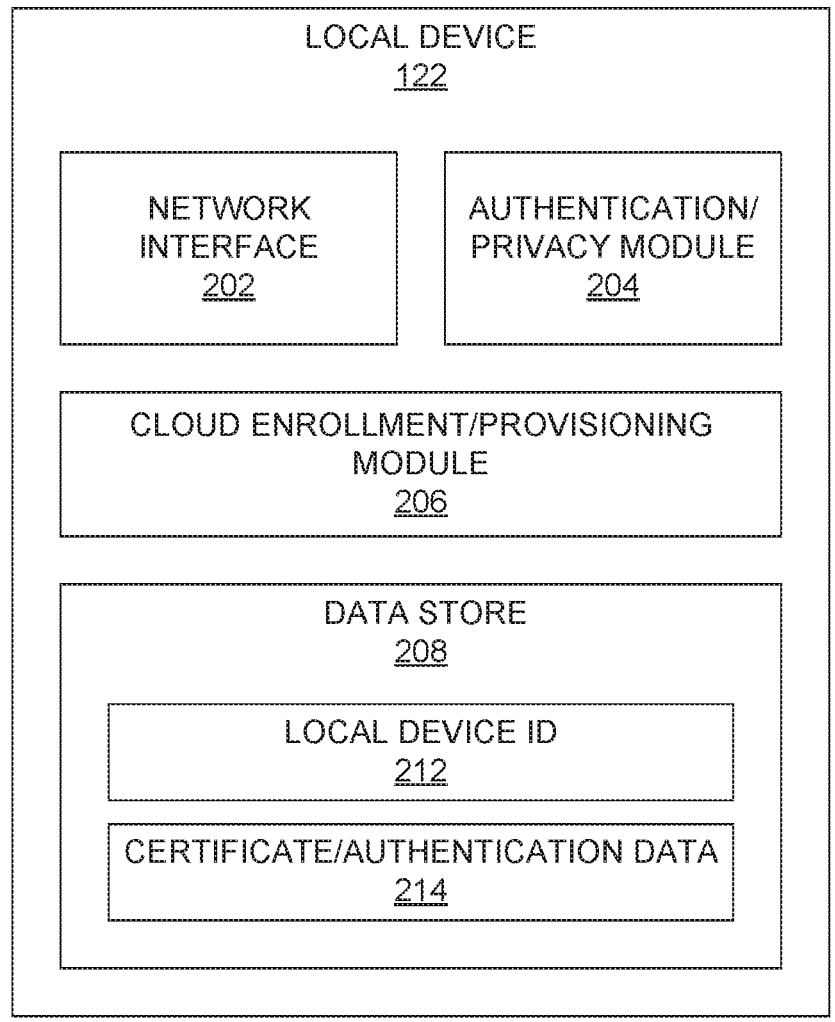
FIG. 2 is a block diagram of the example local device of FIG. 1.

FIG. 2 is a block diagram of an example embodiment of the local device 122 of FIG. 1. As depicted, the local device 122 may include a network interface 202, an authentication/privacy module 204, a cloud enrollment/provisioning module 206, and a data store 208. Such components or modules, in an example embodiment, as well as other components or modules described herein, may be implemented as instructions executable by one or more hardware processors of a machine, such as a computing system. Other modules, such as a data processing module, a data collection module, a user interface, and the like, may be included but are not explicitly discussed herein to focus the following discussion.

The network interface 202, in example embodiments, may be configured to facilitate communication between the local device 122 and either or both of the cloud communication network 130 and the local network 140. Examples of the network interface 202 may include, but are not limited to, one or more of a WiFi® interface, an Ethernet interface, a Bluetooth® interface, an NFC interface, and a Universal Serial Bus (USB) interface.

In example embodiments, the authentication/privacy module 204 may be configured to authenticate the identity of the trusted device 124 and/or the cloud system 101, as well as provide authentication information to the trusted device 124 and/or the cloud system 101. In an example embodiment, the authentication/privacy module 204 may perform two-way authentication (e.g., two-way Transport Layer Security (TLS) authentication) with the trusted device 124 and/or the cloud system 101. Such authentication may also facilitate further communications and operations between the local device 122 and the trusted device 124 and/or the cloud system 101, such as the enrollment and provisioning operations mentioned above. The authentication/privacy module 204 may also employ encryption and decryption (e.g., using private keys, public keys, or the like) in communications with the trusted device 124 and/or the cloud system 101. In example embodiments, the authentication/privacy module 204 may transmit and/or receive device or system identifiers, media access control (MAC) addresses, Internet Protocol (IP) addresses, digital certificates, and/or other information to perform its various authentication and privacy functions.

The data store 208, as shown in FIG. 2, may store data that is employed for authentication of the local device 122, including a local device identifier 212 for the local device 122 and certificate/authentication data 214 (e.g., a digital certificate, privacy keys, and so on) for the local device 122. In example embodiments, other types of data useful for the authentication, privacy, enrollment, and provisioning functions of the local device 122 may also be stored in the data store 208. In an example embodiment, the data store 208 may include one or more types of non-volatile data storage media, possibly including, but not limited to, magnetic disk, optical disk, and flash memory. In some example embodiments, the data store 208 may store authentication and privacy-related data in a data storage area that is separate from a main storage area and is accessible only by a cryptoprocessor, such as in a Trusted Platform Module (TPM).

The cloud enrollment/provisioning module 206, in an example embodiment, may be configured to perform the various enrollment and/or provisioning operations for the local device 122. For example, the cloud enrollment/provisioning module 206 may issue a request (e.g., by way of an API call) to the cloud system 101 (e.g., the enrollment manager 106 of the device manager 102) to enroll with the cloud system 101 to allow subsequent use of one or more applications 114 and/or services 116 of the cloud system 101 by the local device 122. The cloud enrollment/provisioning module 206 may communicate with the cloud system 101 to download software (e.g., in software containers) to the local device 122 for execution thereon to perform various operations expected of the local device 122. In some example embodiments, during the enrollment and/or provisioning operations, the local device 122 may be associated with a particular operational role to be performed by the local device 122 so that the local device 122 is provisioned with the appropriate software, and has access to the appropriate applications 114 and services 116, for that role. Such roles may include, for example, data collection, industrial system or device monitoring, human/machine interface (HMI) operations, and potentially many others.

Figure 3:
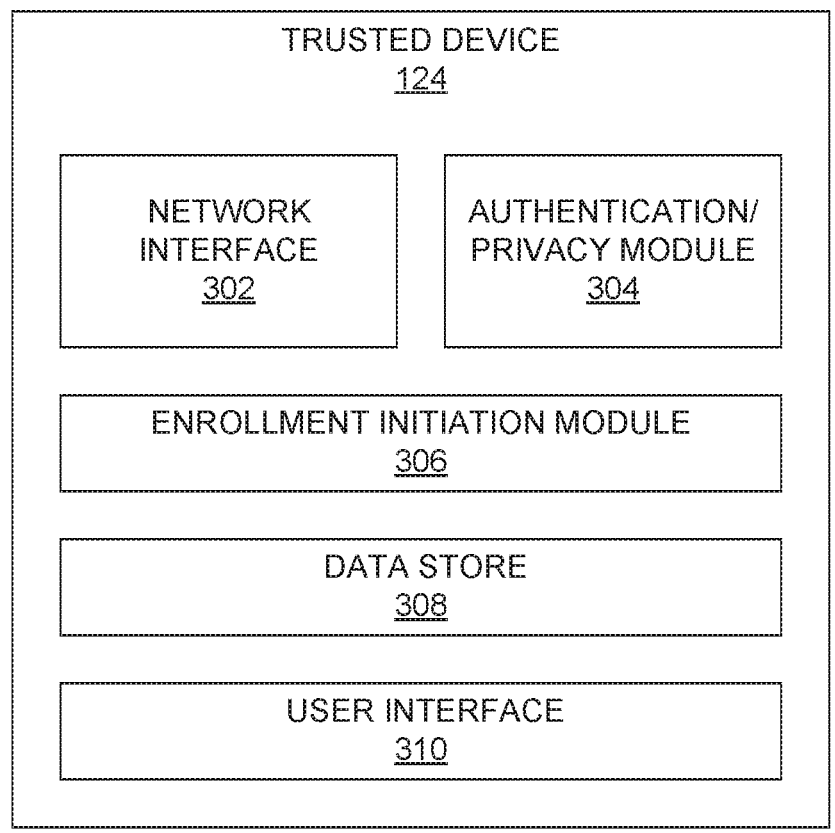
FIG. 3 is a block diagram of the example trusted device of FIG. 1.

FIG. 3 is a block diagram of an example embodiment of the trusted device 124 of FIG. 1. As depicted in FIG. 3, the trusted device 124 may include a network interface 302, an authentication/privacy module 304, an enrollment initiation module 306, a data store 308, and a user interface 310. Such components or modules, in an example embodiment, as well as other components or modules described herein, may be implemented as instructions executable by one or more hardware processors of a machine, such as a computing system. Other modules, such as a data processing module, a location determination module, and the like, may be included but are not explicitly discussed herein to focus the following discussion.

Similar to the network interface 202 of the local device 122, the network interface 302 of the trusted device 124, in an example embodiment, may be configured to facilitate communication between the trusted device 124 and either or both of the cloud communication network 130 and the local network 140. Examples of the network interface 302 may include, but are not limited to, one or more of a WiFi® interface, an Ethernet interface, a Bluetooth® interface, an NFC interface, and a USB interface.

In example embodiments, the authentication/privacy module 304 may be configured to authenticate the identity of the local device 122 and/or the cloud system 101, as well as provide authentication information to the local device 122 and/or the cloud system 101. In an example embodiment, the authentication/privacy module 304 may perform two-way authentication (e.g., two-way TLS authentication) with the local device 122 and/or the cloud system 101. Such authentication may also facilitate further communications and operations between the trusted device 124 and the local device 122 and/or the cloud system 101, as mentioned above. The authentication/privacy module 304 may also employ encryption and decryption (e.g., using private keys, public keys, or the like) in communications with the local device 122 and/or the cloud system 101. In example embodiments, the authentication/privacy module 304 may transmit and/or receive device or system identifiers, MAC addresses, IP addresses, digital certificates, and/or other information to perform its various authentication and privacy functions.

In an example embodiment, the enrollment initiation module 306 may be configured to engage in communication with the local device 122 and the cloud system 101 to initiate enrollment by the local device 122 at the cloud system 101. In an example embodiment, the enrollment initiation module 306 receives a device identifier for the local device 122 from the local device 122 and employs the device identifier in communications with the cloud system 101 to receive credential information from the cloud system 101. The enrollment initiation module 306 may then forward the received credential information to the local device 122 to facilitate the enrollment of the local device 122 with the cloud system 101, as well as possible provisioning of the local device 122 by the cloud system 101. In an example embodiment, the forwarding of the credential information to the local device 122 may be interpreted by the local device 122 as a request or command to enroll with the cloud system 101, possibly using additional information provided by the trusted device 124. An example embodiment of the operation of the enrollment initiation module 306 is described in greater detail below in conjunction with FIG. 4.

In an example embodiment, the data store 308 may be configured to store information received from the local device 122 (e.g., the device identifier for the local device 122), the cloud system 101 (e.g., the credential information to be transferred to the local device 122), and possibly other information sources. Similar to the data store 208 of the local device 122, the data store 308, in example embodiments, may include one or more types of non-volatile data storage media, possibly including, but not limited to, magnetic disk, optical disk, and flash memory.

The user interface 310, in an example embodiment, may be configured to display an indication (e.g., the device identifier or some indication thereof) of the local device 122 to a user of the trusted device 124, as well as to receive a user selection of the local device 122 to initiate the enrollment and possible provisioning of the local device 122. In some example embodiments, indications of multiple local devices 122 may be displayed, and the user may select multiple such indications to initiate the enrollment and possible provisioning of the corresponding local devices 122. The user interface 310, in example embodiments, may include a touchscreen integrating both a display device and a touch-sensitive user input surface, often employed in smart phones, tablet computers, and the like. Other examples of the user interface 310 may include, but are not limited to, a display device, a mouse, a touchpad, a keyboard, and so on.

Figure 4:
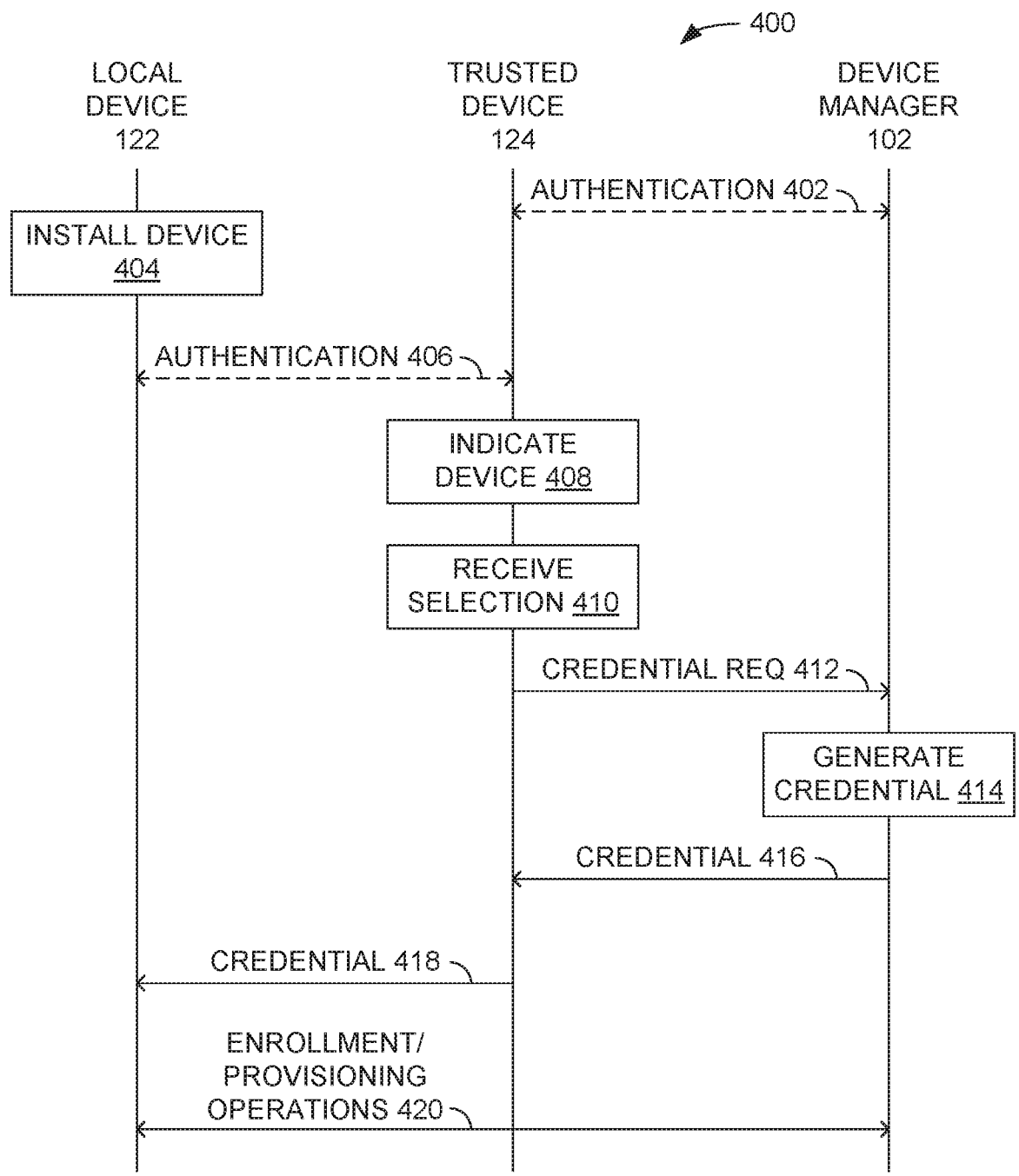
FIG. 4 is a communication diagram depicting example communications and operations among the local device, the trusted device, and an example device manager of the cloud computing system of FIG. 1.

FIG. 4 is a communication diagram depicting example communications and operations 400 among the local device 122, the trusted device 124, and the device manager 102 of the cloud computing system 101 of FIG. 1. While the various communications and operations 400, as well as others presented herein, are described in view of the environment illustrated in FIGS. 1-3, other systems or devices not specifically discussed herein may perform the same operations in other embodiments. Moreover, while the various communications and operations 400 are presented in FIG. 4 in a particular order of execution, other orders of execution, including possible overlapping, simultaneous, or concurrent execution of two or more operations 400 are possible in other example embodiments.

As depicted in FIG. 4, the trusted device 124 and the device manager 102 may authenticate each other in an authentication operation (operation 402). The authentication 402 may ensure that subsequent communications that occur between the trusted device 124 and the device manager 102 are taking place with known devices, and that the communications between the trusted device 124 and the device manager 102 are secure, such as by way of encryption and corresponding decryption using public and/or private keys, or other shared secrets. In an example embodiment, the trusted device 124 may be authenticated by the device manager 102 by way of credentials supplied on behalf of a customer of the cloud system 101, such as a particular corporation or other organization associated with the trusted device 124. For example, the organization owning or controlling the trusted device 124 may be responsible for obtaining credential information for the trusted device 124, such as from a certificate authority (CA). In example embodiments, the authentication between the trusted device 124 and the cloud system 101 (e.g., the device manager 102) may be implemented using two-way TLS authentication.

Also in example embodiments, the trusted device 124 may be a smart phone, tablet computer, laptop computer, desktop computer, or other user device that may be employed by a technician, a system operator, or other personnel associated with the corporation or other organization associated with the trusted device 124. Similarly, in example embodiments, the cloud system 101 may be a system operated or controlled by the organization, or the organization may be a customer of an organization providing the cloud system 101.

After the authentication of the trusted device 124 and the device manager 102, the local device 122 may be installed (operation 404). In an example embodiment, the local device 122 may be an industrial controller, monitor, data collector, or other device associated with an industrial system (e.g., a power generation plant, a manufacturing operation, or the like). The installation, in example embodiments, may involve coupling (e.g., mechanically, electrically, etc.) the local device 122 to one or more items of equipment of the industrial system and powering up the local device 122.

After the local device 122 has been installed (operation 404) and is ready for operation, the local device 122 and the trusted device 124 may engage in an authentication operation or process (operation 406) by way of the local network 140. In example embodiments, the local network 140 is supported by a router (e.g., a WiFi® router) providing a communication connection between the local device 122 and the trusted device 124, as well as providing a connection to a gateway coupling the local network 140 to the cloud communication network 130. As discussed above, in an example embodiment, the authentication may occur via a two-way TLS authentication process between the local device 122 and the trusted device 124.

In an example embodiment, the local network 140 may be a communication connection specifically created between the local device 122 and the trusted device 124 without the use of a router, such as by way of a Bluetooth® connection, a WiFi® Direct connection, or the like. In an example embodiment, the local device 122 may expose such a local communication connection to the trusted device 124. In response, the trusted device 124 may communicatively connect to the local device 122 via the exposed communication connection. In response to the establishing of the local communication connection, the trusted device 124, in an example embodiment, may receive or retrieve a root certificate from the local device 122 that identifies a website or other location associated with a root certificate authority that is accessible via the cloud communication network 130. The trusted device 124 may retrieve or receive a digital certificate or other information from the root certificate authority authenticating the local device 122. In an example embodiment, the root certificate may be stored as certificate/authentication data 214 in the data store 208, such as in a TPM, as indicated above. In yet other example embodiments, the local device 122 and the trusted device 124 may authenticate each other via other means or processes, such as by way of certificates associated with an organization associated with either or both of the local device 122 and the trusted device 124.

During or after the authentication of the local device 122 and the trusted device 124, the trusted device 124 may receive a device identifier for the local device 122. In an example embodiment, the trusted device 124 may display an indication of the local device 122 (operation 408) (possibly along with indications of other local devices 122) via the user interface 310 (e.g., via a touchscreen). In response to displaying the indication of the local device 122, the trusted device 124 may receive a selection of the local device 122 via the user interface 310 (operation 410) (e.g., from a technician or system operator using the trusted device 124). In example embodiments, the selection of the local device 122 may signal the trusted device 124 that the local device 122 is to enroll with the cloud system 101 (e.g., via the device manager 102) so that the local device 122 may fulfill some operational role within the environment (e.g., the industrial system) in which it is installed.

In response to the user selection of the local device 122, in an example embodiment, the trusted device 124 may request credential information from the device manager 102 (operation 412) via the cloud communication network 130 to facilitate enrollment of the local device 122 with the device manager 102. In an example embodiment, the trusted device 124 may provide the device identifier for the local device 122 in the credential request 412. In response to the credential request 412, the device manager 102 may generate and/or provide credential information (operation 414) to be used by the local device 122 to communicate with the device manager 102, and then transmit the credential information (operation 416) to the trusted device 124 via the cloud communication network 130. This credential information, in an example embodiment, may include one or more encryption/decryption keys to be employed by the local device 122 when communicating with the device manager 102. In some example embodiments, the credential information may also include information indicating a network address (e.g., a URL) for the device manager 102 or other information for the local device 122 to employ to enroll with the device manager 102. Other types of information useful for the local device 122 for enrollment purposes, such as an identifier employed by the device manager 102 for the local device 122, may also be included.

In response to receiving the credential information, as well as any related information, the trusted device 124, in an example embodiment, may transmit that information to the local device 122 via the local network 140 (operation 418). In an example embodiment, the trusted device 124 may transmit the credential information over a direct local communication connection with the local device 122 that was previously exposed by the local device 122; over a local network 140 serving the local device 122, the trusted device 124, and other devices in the local network area 120; or over another local network 140.

The local device 122, in response to receiving the credential information (operation 418), may enroll with the device manager 102 (e.g., the enrollment manager 106) via the cloud communication network 130 (operation 420) using the received credential information. In an example embodiment, enrolling the local device 122 may result in the enrollment manager 106 providing one or more applications 114 and/or services 116 available at the cloud system 101 for use by the local device 122, as described above. Further, the particular applications 114 and/or services 116 made available to the local device 122 may be based on a particular operational role played by the local device 122, which may have been selected by the user of the trusted device 124. In one example embodiment, the trusted device 124 may transmit a user-selected operational role for the local device 122 with the device identifier as part of the credential request (operation 412). In another example embodiment, the trusted device 124 may transmit the user-selected operational role for the local device 122 with the received credentials to the local device 122 (operation 418).

Additionally, in some example embodiments, the cloud system 101 (e.g., the provisioning manager 112), based on the enrollment of the local device 122, may provision the local device 122 with software via the cloud communication network 130, as described above. The provisioning of the local device 122 may also be based on a particular operational role selected for the local device 122 as discussed above.

Figure 5A:
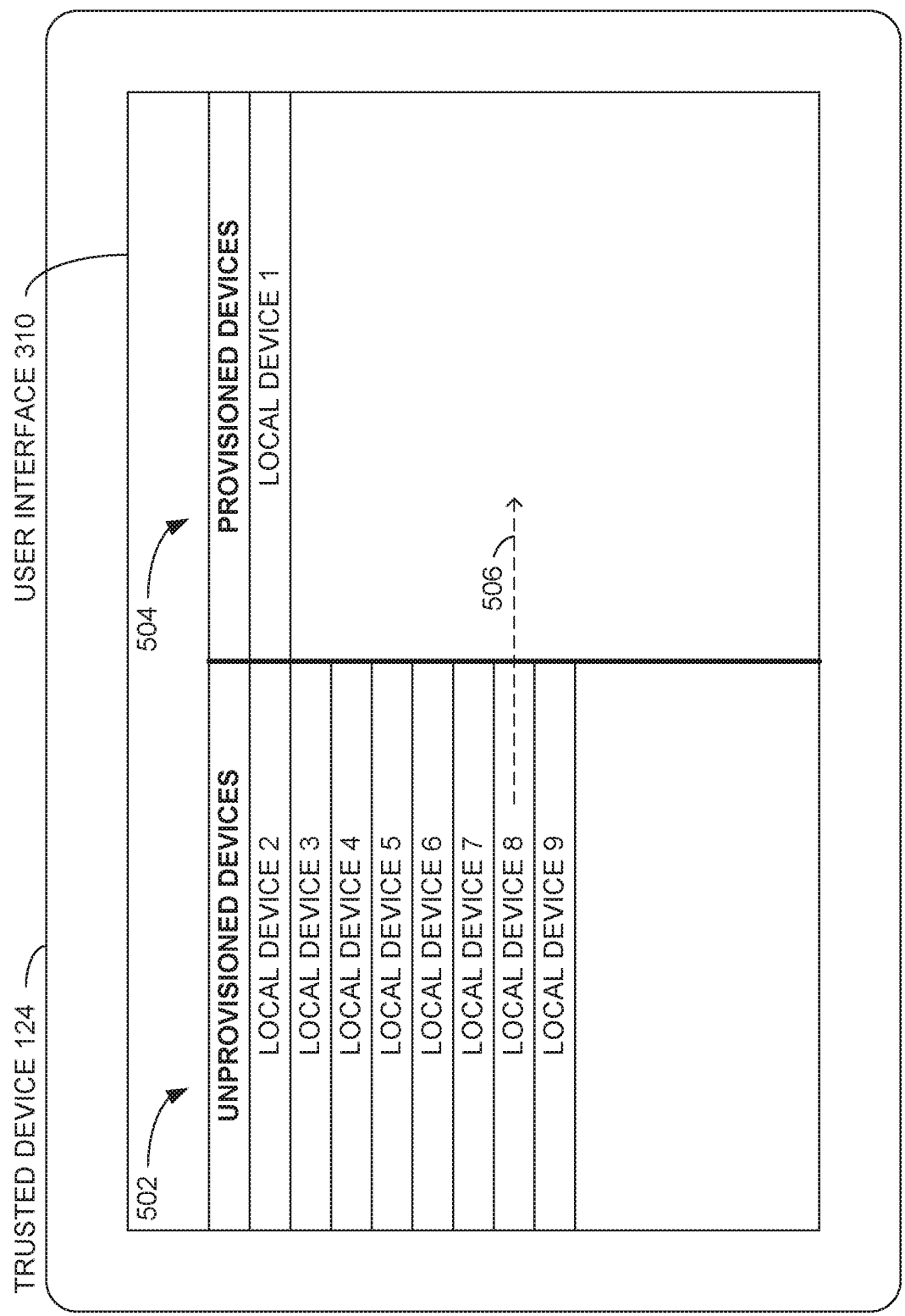
FIG. 5A is a graphical representation of a user interface displaying provisioned and unprovisioned local devices, and indicating a selected local device for provisioning, as displayed by the trusted device of FIG. 1.

FIG. 5A is a graphical representation of the user interface 310 of the trusted device 124 displaying currently provisioned local devices 504 and currently unprovisioned local devices 502, each of which may be a local device 122, as described above. In this particular example, a user of the trusted device 124 is indicating a selection of a particular unprovisioned (or unenrolled) local device 502 (LOCAL DEVICE 8) from a list of unprovisioned local devices 502 (LOCAL DEVICE 2 through LOCAL DEVICE 9) for provisioning, as displayed by the trusted device 124. As shown in FIG. 5A, a single provisioned local device 504 (LOCAL DEVICE 1) has already been enrolled and/or provisioned at this point. In this particular example, the user indicates the selection of the unprovisioned local device 502 for enrollment and/or provisioning by way of "dragging" (operation 506) the LOCAL DEVICE 8 indicator from the list of the unprovisioned local devices 502 to the list of provisioned local devices 504. Other methods of selecting a particular unprovisioned local device 502 for enrollment or provisioning may be provided in other example embodiments of the user interface 310 of the trusted device 124.

Figure 5B:
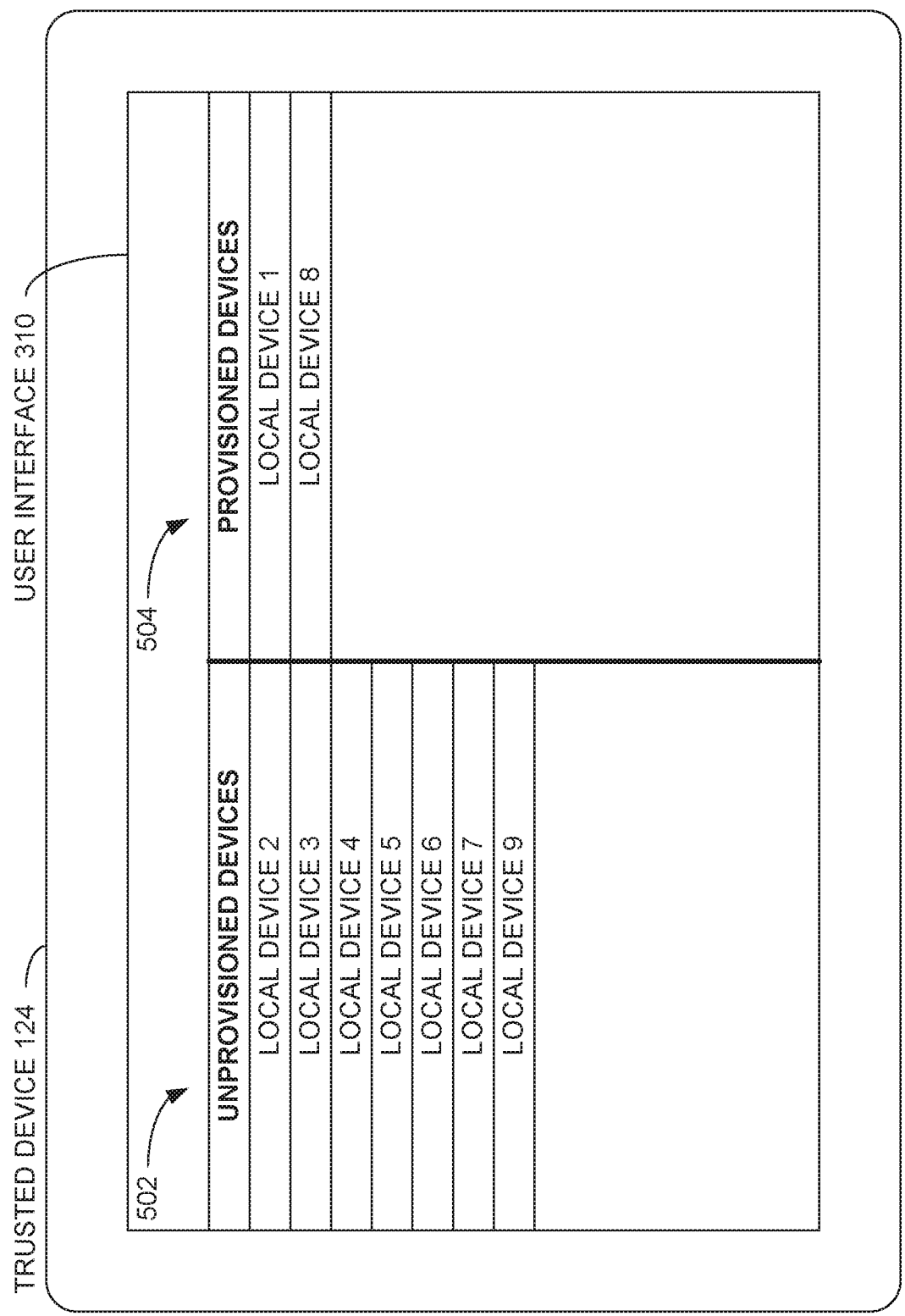
FIG. 5B is a graphical representation of a user interface displaying provisioned and unprovisioned local devices, and indicating the selected local device in a provisioned state, as displayed by the trusted device of FIG. 1.

FIG. 5B is a graphical representation of the user interface 310 of the trusted device 124 displaying provisioned local devices 504 and unprovisioned local devices 502 after the unprovisioned local device 502 selected in FIG. 5A has been enrolled and/or provisioned (e.g., as described above), resulting in the selected local device 122 (LOCAL DEVICE 8) being displayed by the user interface 310 in the list of provisioned local devices 504. In some example embodiments, the user interface 310 may facilitate selection of one or more provisioned (or enrolled) local devices 504 for de-provisioning and/or disenrollment, such as by way of dragging one of the provisioned local devices 504 toward the list of unprovisioned local devices 502.

Figure 6A:
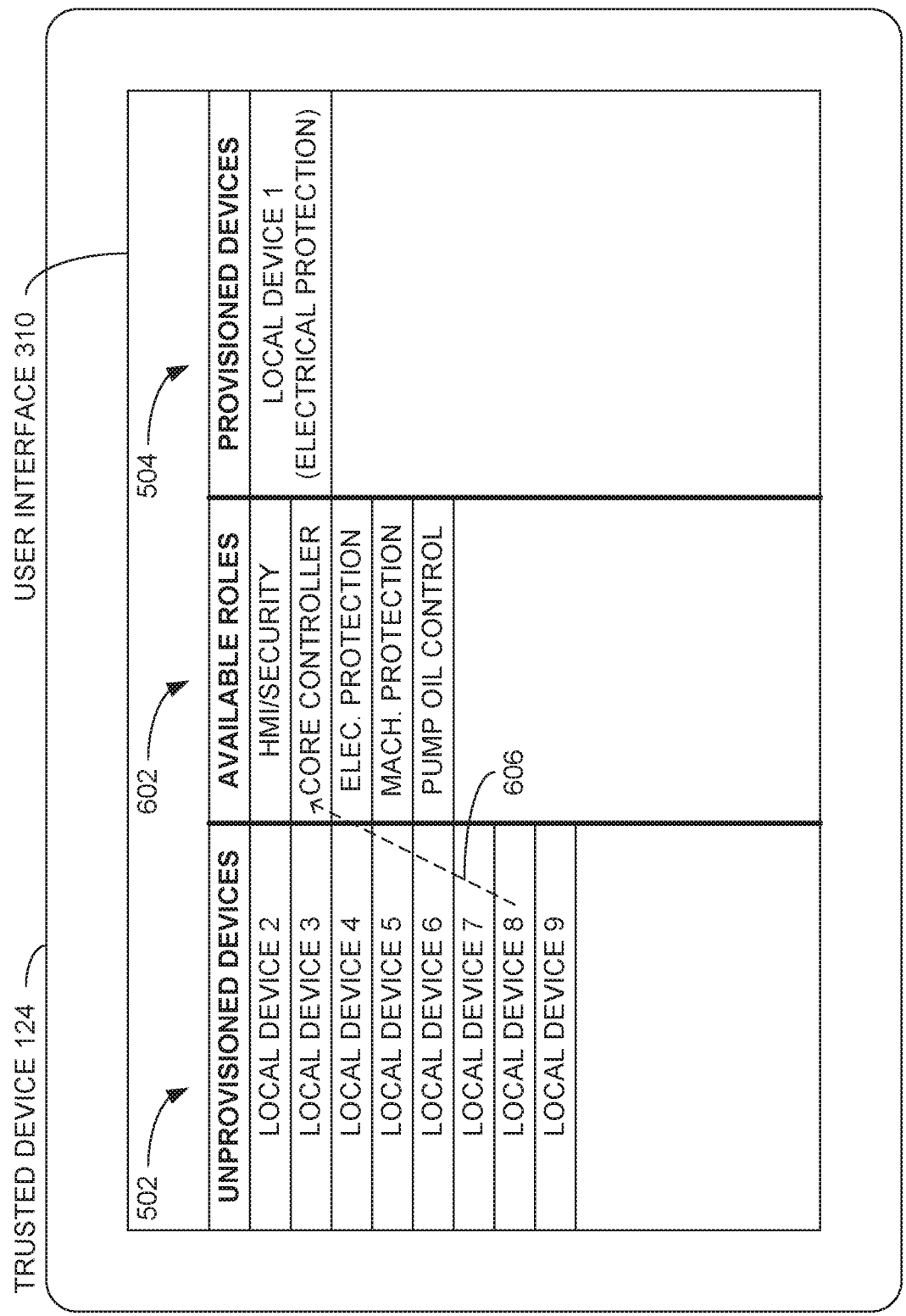
FIG. 6A is a graphical representation of a user interface displaying provisioned and unprovisioned local devices, and indicating a selected local device for provisioning according to a particular operational role, as displayed by the trusted device of FIG. 1.

FIG. 6A is a graphical representation of the user interface 310 of the trusted device 124 displaying currently provisioned local devices 504, currently unprovisioned local devices 502, and available operational roles 602 (e.g., HMI (Human/Machine Interface)/SECURITY, CORE CONTROLLER, ELECTRICAL PROTECTION, and so forth) for one or more of the unprovisioned local devices 502. In addition, FIG. 6A indicates a user selection of an unprovisioned (or unenrolled) local device 502 (LOCAL DEVICE 8) for provisioning according to a particular operational role 602 (CORE CONTROLLER), such as by way of dragging (operation 606) the LOCAL DEVICE 8 indicator to the selected operational role 602 of CORE CONTROLLER. As mentioned above with respect to FIG. 5A, selection methods other than dragging may be employed in other example embodiments for the selection of a particular operational role 602 for an unprovisioned (or unenrolled) local device 502. For example, each of the available operational roles 602 may be represented by particular locations or elements of a map, schematic, or other representation of an industrial system or environment in which the unprovisioned local devices 502 are installed.

Figure 6B:
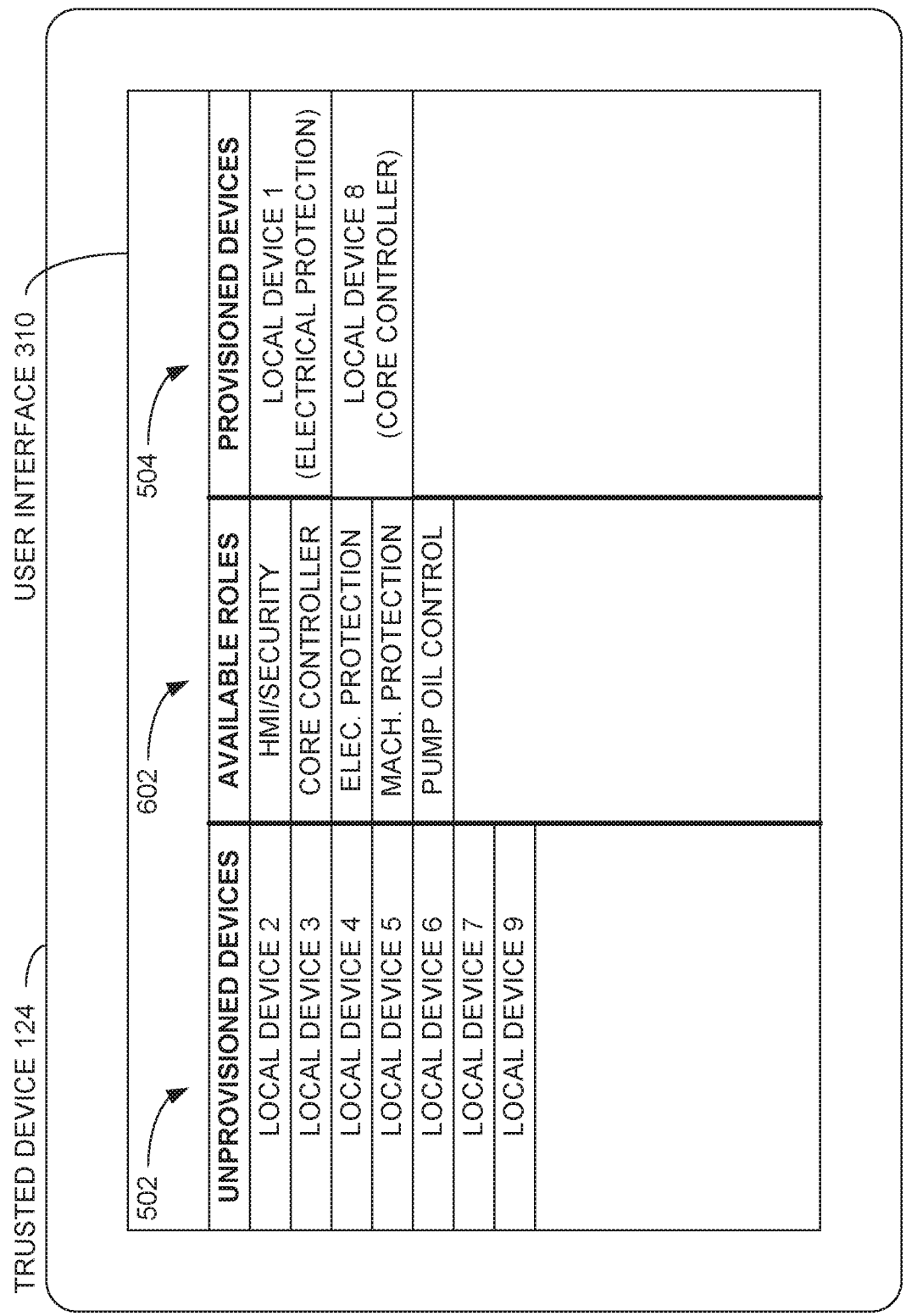
FIG. 6B is a graphical representation of a user interface displaying provisioned and unprovisioned local devices, and indicating the selected local device in a provisioned state according to the particular operational role, as displayed by the trusted device of FIG. 1.

FIG. 6B is a graphical representation of the user interface 310 of the trusted device 124 after the selected unprovisioned local device 502 (LOCAL DEVICE 8) has been enrolled, and possibly provisioned (e.g., as described above), resulting in LOCAL DEVICE 8 being listed as one of the provisioned local devices 504, along with its associated operational role (CORE CONTROLLER). As discussed above with respect to FIG. 5B, a user of the trusted device 124 may de-provision and/or disenroll a particular provisioned or enrolled local device 504, such as by way of dragging the selected provisioned local device 504 toward the list of unprovisioned local devices 502.

In various embodiments described above, each local device 122 may be an individual hardware device or system. In yet other example embodiments, each local device 122 may be a separately identifiable, enrollable, and/or provisionable portion of a physical device, such as, for example, a separate virtual machine of multiple virtual machines that may execute on a single computing system. In other example embodiments, each of multiple software containers that include software that is executable on a single computing system may be considered a separate local device 122 for enrollment and/or provisioning by the cloud system 101.

In an example embodiment, a method for initiating enrollment of a local device with a cloud computing system comprises receiving, by a separate device from the local device via a local communication connection, a device identifier for the local device, the separate device being trusted by the cloud computing system for communication with the cloud computing system; causing display, via a user interface of the separate device, an indicator for the local device; receiving, via the user interface of the separate device, an activation of the indicator for the local device to initiate enrollment of the local device with the cloud computing system; issuing, by at least one hardware processor of the separate device to the cloud computing system via a wide area network, in response to the activation, a request to receive credential information enabling the local device to enroll with the cloud computing system; receiving, by the separate device from the cloud computing system via the wide area network, in response to the request, the credential information; and transmitting, by the separate device to the local device via the local communication connection, the credential information.

In another example embodiment, including all previous example embodiments, the issuing of the request comprises transmitting a call to an application programming interface of a device manager of the cloud computing system, and wherein the call comprises the request.

In another example embodiment, including all previous example embodiments, the method further comprises authenticating, by the separate device, the local device, wherein the authenticating of the local device comprises the receiving of the device identifier for the local device.

In another example embodiment, including all previous example embodiments, a two-way authentication process between the separate device and the local device comprises the authenticating of the local device.

In another example embodiment, including all previous example embodiments, the method further comprises connecting, by the separate device, to the local communication connection in response to the local device exposing the local communication connection, wherein the authenticating of the local device occurs via the local communication connection.

In another example embodiment, including all previous example embodiments, the method further comprises transmitting, by the separate device to the local device via the local communication connection, network address information for the cloud computing system enabling the local device to enroll with the cloud computing system using the credential information.

In another example embodiment, including all previous example embodiments, the network address information comprises a uniform resource locator for a device manager of the cloud computing system.

In another example embodiment, including all previous example embodiments, the local communication connection comprises a wireless local communication connection.

In another example embodiment, including all previous example embodiments, the method further comprises receiving, via the user interface of the separate device, a selection of an operational role for the local device; and transmitting, by the separate device to the local device via the local communication connection, an indication of the operational role to facilitate provisioning of the local device with software corresponding to the operational role by the cloud computing system via the wide area network.

In another example embodiment, including all previous example embodiments, the method further comprises receiving, via the user interface of the separate device, a selection of an operational role for the local device; and transmitting, by the separate device to the cloud computing system via the wide area network, an indication of the operational role to facilitate provisioning of the local device with software corresponding to the operational role by the cloud computing system via the wide area network.

In an example embodiment, a method for initiating enrollment of a local device with a cloud computing system comprises transmitting, by the local device to a separate device via a local communication connection, a device identifier for the local device, the separate device being trusted by the cloud computing system for communication with the cloud computing system; receiving, by the local device from the separate device via the local communication connection, after the transmitting of the device identifier for the local device, credential information for the local device enabling enrollment of the local device with the cloud computing system; and transmitting, by at least one hardware processor of the local device to the cloud computing system via a wide area network, a request to enroll the local device with the cloud computing system using the credential information.

In another example embodiment, including all previous example embodiments, the method further comprises receiving, by the local device from the cloud computing system via the wide area network, software to be executed on the local device based on an enrolling of the local device with the cloud computing system.

In another example embodiment, including all previous example embodiments, the receiving of the software comprises receiving at least one software container including the software; and the method further comprises installing the software container at the local device for execution atop an operating system of the local device.

In another example embodiment, including all previous example embodiments, the method further comprises installing, by the local device, the software in a virtual machine executing on the local device.

In another example embodiment, including all previous example embodiments, the method further comprises authenticating, by the local device, the separate device via the local communication connection, wherein the authenticating comprises the transmitting of the device identifier for the local device.

In another example embodiment, including all previous example embodiments, the method further comprises exposing, by the local device, the local communication connection to the separate device, wherein the authenticating of the separate device occurs in response to the exposing of the local communication connection.

In another example embodiment, including all previous example embodiments, the method further comprises receiving, by the local device from the separate device via the local communication connection, network address information for the cloud computing system, wherein an enrolling of the local device employs the network address information.

In another example embodiment, including all previous example embodiments, the method further comprises receiving, by the local device from the separate device via the local communication connection, an indication of an operational role for the local device; and receiving, by the local device from the cloud computing system via the wide area network, software to be executed on the local device based on an enrolling of the local device with the cloud computing system, wherein the software is configured according to the operational role for the local device.

In an example embodiment, a user device comprises a user interface; one or more hardware processors; and a memory storing instructions that, when executed by at least one of the one or more hardware processors, cause the user device to perform operations comprising receiving, from a local device via a local communication connection, a device identifier for the local device, the user device being trusted by a cloud computing system for communication with the cloud computing system; causing display, via the user interface, an indicator for the local device; receiving, via the user interface, an activation of the indicator for the local device to initiate enrollment of the local device with the cloud computing system; issuing, to the cloud computing system via a wide area network, in response to the activation, a request to receive credential information enabling the local device to enroll with the cloud computing system; receiving, from the cloud computing system via the wide area network, the credential information; and transmitting, to the local device via the local communication connection, the credential information.

In an example embodiment, a local device comprises one or more hardware processors; and a memory storing instructions that, when executed by at least one of the one or more hardware processors, cause the local device to perform operations comprising transmitting, to a separate device via a local communication connection, a device identifier for the local device, the separate device being trusted by a cloud computing system for communication with the cloud computing system; receiving, from the separate device via the local communication connection, after the transmitting of the device identifier for the local device, credential information for the local device enabling enrollment of the local device with the cloud computing system; and transmitting, to the cloud computing system via the wide area network, a request to enroll the local device with the cloud computing system using the credential information.

Figure 7:
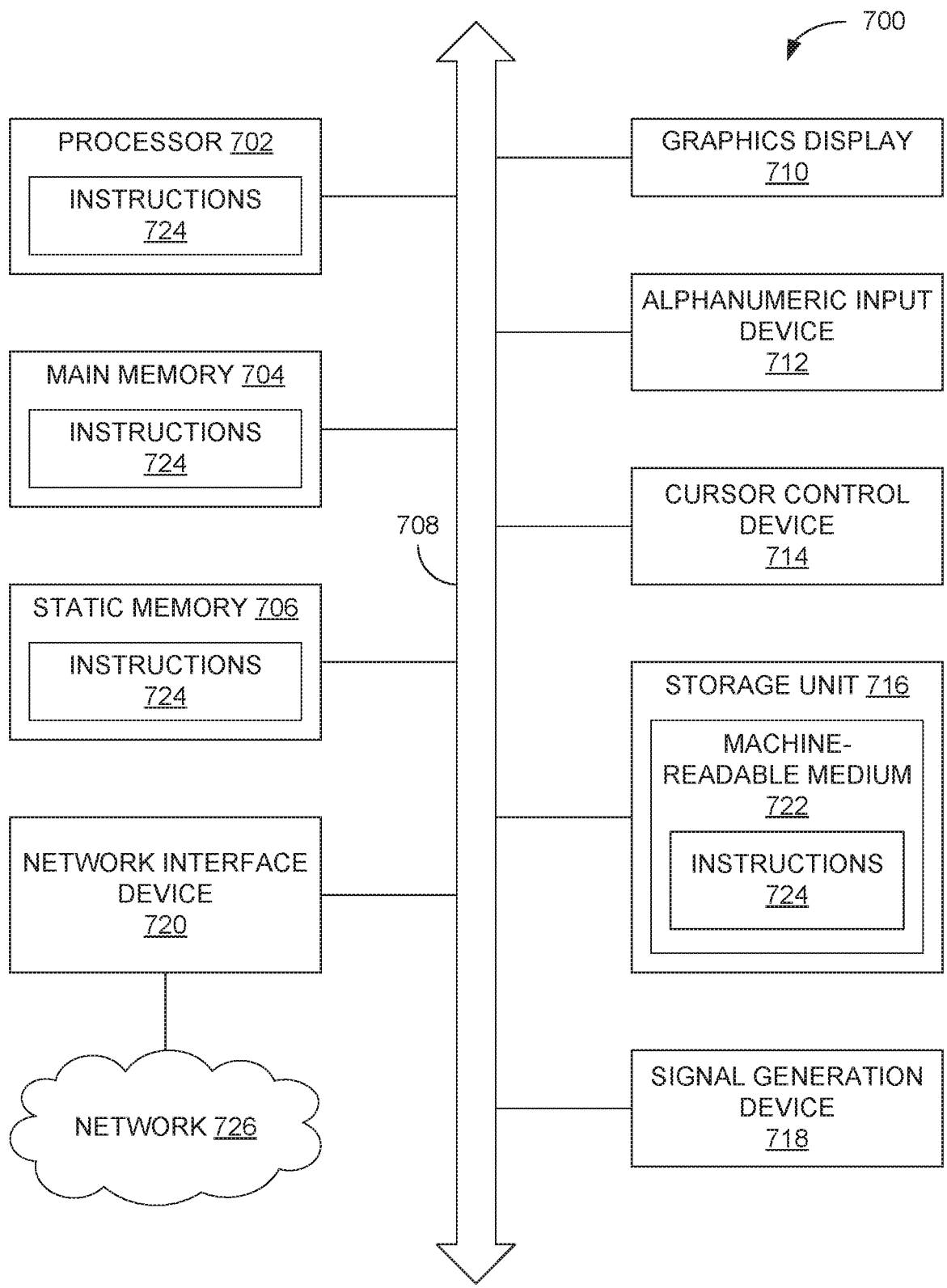
FIG. 7 is a block diagram of a machine or device in the example form of a computer system within which instructions for causing the machine or device to perform any one or more of the methodologies discussed herein may be executed.

FIG. 7 is a block diagram illustrating components of a machine 700, according to some example embodiments, able to read instructions 724 from a machine-readable medium 722 (e.g., a non-transitory machine-readable medium, a machine-readable storage medium, or a computer-readable storage medium) and perform any one or more of the methodologies discussed herein, in whole or in part. Specifically, FIG. 7 depicts the machine 700 in the example form of a computer device (e.g., a computer) within which the instructions 724 (e.g., software, firmware, a program, an application, an applet, an app, or other executable code) for causing the machine 700 to perform any one or more of the methodologies discussed herein, in whole or in part, may be executed.

For example, the instructions 724 may cause the machine 700 to execute the flow diagram of FIG. 4 and the user interfaces of FIGS. 5A, 5B, 6A, and 6B, as well as all example embodiments associated therewith. The instructions 724 can transform the general, non-programmed machine 700 into a particular machine (e.g., specially configured machine) programmed to carry out the described and illustrated functions in the manner described. Also, in example embodiments, the machine 700 may operate as one or more of the system, modules, or components of FIGS. 1-3, or any other computing system or device described herein.

In example embodiments, the machine 700 operates as a standalone device or may be connected (e.g., networked) to other machines. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, a connected industrial appliance, or any other machine 700 capable of executing the instructions 724, sequentially or otherwise, that specify actions to be taken by that machine 700. Further, while only a single machine 700 is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light-emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-readable medium 722 (e.g., a tangible machine-readable storage medium) on which are stored the instructions 724 embodying any one or more of the methodologies or functions described herein. The instructions 724 may also reside, completely or at least partially, within the main memory 704, within the processor 702 (e.g., within a cache memory of the processor 702), or both, before or during execution thereof by the machine 700. Accordingly, the main memory 704 and the processor 702 may be considered machine-readable media 722 (e.g., tangible and non-transitory machine-readable media).

In some example embodiments, the machine 700 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium, or combination of multiple media, that is capable of storing the instructions 724 for execution by a machine (e.g., machine 700), such that the instructions 724, when executed by one or more processors of the machine 700 (e.g., processor 702), cause the machine 700 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 722 is non-transitory in that it does not embody a propagating or transitory signal. However, labeling the machine-readable medium 722 as "non-transitory" should not be construed to mean that the medium is incapable of movement; the medium should be considered as being transportable from one physical location to another in some example embodiments. Additionally, since the machine-readable medium 722 is tangible, the medium may be considered a machine-readable device.

The instructions 724 may further be transmitted or received over a communication network 726 using a transmission medium via the network interface device 720 and utilizing any one of a number of well-known transfer protocols (e.g., Hypertext Transfer Protocol (HTTP)). Examples of communication networks 726 include a local area network (LAN), a wide area network (WAN), the Internet, mobile telephone networks, plain old telephone service (POTS) networks, and wireless data networks (e.g., WiFi®, LTE®, and WiMAX™ networks). The term "transmission medium" shall be taken to include any intangible medium that is capable of storing, encoding, or carrying the instructions 724 for execution by the machine 700, and includes digital or analog communication signals or other intangible media to facilitate communication of such software.

Certain example embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. A hardware module may be a special-purpose processor, such as a field-programmable gate array (FPGA) or an application-specific integrated circuit (ASIC). A hardware module may also include programmable logic or circuitry that is temporarily configured by software to perform certain operations. As another example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for initiating enrollment of a local device with a cloud computing system, the method comprising:
   executing a first authentication process between a cloud computing system and a separate device such that subsequent communications between the cloud computing system and the separate device are secure;
   installing a local device, wherein the local device is an industrial Internet of Things (IIoT) device in an industrial system that is configured to measure industrial data, the data comprising one or more of a temperature, a pressure, a fluid flow volume, a fluid flow rate, or a force, wherein the local device is one of an industrial controller, industrial monitor, or industrial data collector;
   wherein the industrial system is a power generating plant or a manufacturing operation;
   subsequent to executing the first authentication process and installing the local device, executing a second authentication process between the separate device and the local device;
   receiving, at the separate device from the local device via a local communication connection, a device identifier for the local device, the separate device upon completion of the first authentication process being trusted by the cloud computing system for communication with the cloud computing system;
   causing display, via a user interface at the separate device, an indicator for the local device;
   receiving, via the user interface at the separate device, an activation of the indicator for the local device to initiate enrollment of the local device with the cloud computing system;
   in response to the activation, issuing, by at least one hardware processor of the separate device, a request to the cloud computing system for credential information, the credential information enabling the local device to enroll with the cloud computing system, wherein the request is made via a wide area network;
   in response to the request, receiving, at the separate device from the cloud computing system via the wide area network, the credential information; and
   transmitting, by the separate device, the credential information to the local device via the local communication connection;
   wherein the industrial data is sent from the local device to the cloud;
   wherein the user interface is configured to render indications of currently provisioned local devices, currently unprovisioned local devices, and available operational roles for the unprovisioned local devices, wherein the available operational roles are represented by particular locations or elements in a representation of an industrial system or environment.

2. The method of claim 1, wherein the issuing of the request comprises transmitting a call to an application programming interface of a device manager of the cloud computing system.

3. The method of claim 1, wherein the second authentication comprises authenticating, at the separate device, the local device, wherein the authenticating of the local device comprises the receiving of the device identifier for the local device.

4. The method of claim 3, further comprising:
   connecting, by the separate device, to the local communication connection in response to the local device exposing the local communication connection, wherein the authenticating of the local device occurs via the local communication connection.

5. The method of claim 1, further comprising:
   transmitting, by the separate device to the local device via the local communication connection, network address information for the cloud computing system enabling the local device to enroll with the cloud computing system using the credential information.

6. The method of claim 5, wherein the network address information comprises a uniform resource locator for a device manager of the cloud computing system.

7. The method of claim 1, wherein the local communication connection comprises a wireless local communication connection.

8. The method of claim 1, further comprising:
   receiving, via the user interface of the separate device, a selection of an operational role for the local device; and
   transmitting, by the separate device to the local device via the local communication connection, an indication of the operational role to facilitate provisioning of the local device with software corresponding to the operational role by the cloud computing system via the wide area network.

9. The method of claim 1, further comprising:
   receiving, via the user interface of the separate device, a selection of an operational role for the local device; and
   transmitting, by the separate device to the cloud computing system via the wide area network, an indication of the operational role to facilitate provisioning of the local device with software corresponding to the operational role by the cloud computing system via the wide area network.

10. A method for initiating enrollment of a local device with a cloud computing system, the method comprising:
executing a first authentication process between a cloud computing system and a separate device such that subsequent communications between the cloud computing system and the separate device are secure;
installing a local device, wherein the local device is an industrial Internet of Things (IIoT) device in an industrial system that is configured to measure industrial data, the industrial data comprising one or more of a temperature, a pressure, a fluid flow volume, a fluid flow rate, or a force, wherein the local device is one of an industrial controller, industrial monitor, or industrial data collector;
wherein the industrial system is a power generating plant or a manufacturing operation;
subsequent to executing the first authentication process and installing the local device, executing a second authentication process between the separate device and the local device;
transmitting, by the local device to the separate device via a local communication connection, a device identifier for the local device, the separate device upon completion of the first authentication process being trusted by the cloud computing system for communication with the cloud computing system;
by the separate device, obtaining credential information from the cloud using the identifier;
receiving, at the local device from the separate device via the local communication connection, after the transmitting of the device identifier for the local device, the credential information for the local device from the separate device, the credential information enabling enrollment of the local device with the cloud computing system; and
transmitting, by at least one hardware processor of the local device to the cloud computing system via a wide area network, a request to enroll the local device with the cloud computing system using the credential information;
wherein the industrial data is sent from the local device to the cloud;
wherein a user interface at the separate device is configured to render indications of currently provisioned local devices, currently unprovisioned local devices, and available operational roles for the unprovisioned local devices, wherein the available operational roles are represented by particular locations or elements in a representation of an industrial system or environment.

11. The method of claim 10, further comprising:
receiving, at the local device from the cloud computing system via the wide area network, software to be executed on the local device based on an enrolling of the local device with the cloud computing system.

12. The method of claim 11, wherein:
the receiving of the software comprises receiving at least one software container including the software; and
the method further comprises installing the software container at the local device for execution atop an operating system of the local device.

13. The method of claim 11, further comprising:
installing, at the local device, the software in a virtual machine executing on the local device.

14. The method of claim 10, wherein the second authentication comprises authenticating, at the local device, the separate device via the local communication connection, wherein the authenticating comprises the transmitting of the device identifier for the local device.

15. The method of claim 14, further comprising:
exposing, by the local device, the local communication connection to the separate device, wherein the authenticating of the separate device occurs in response to the exposing of the local communication connection.

16. The method of claim 10, further comprising:
receiving, at the local device from the separate device via the local communication connection, network address information for the cloud computing system, wherein an enrolling of the local device employs the network address information.

17. The method of claim 10, further comprising:
receiving, at the local device from the separate device via the local communication connection, an indication of an operational role for the local device; and
receiving, at the local device from the cloud computing system via the wide area network, software to be executed on the local device based on an enrolling of the local device with the cloud computing system, wherein the software is configured according to the operational role for the local device.

18. A user device comprising:
a user interface;
one or more hardware processors; and
a memory storing instructions that, when executed by at least one of the one or more hardware processors, cause the user device to perform operations comprising:
executing a first authentication process between a cloud computing system and the user device such that subsequent communications between the cloud computing system and the user device are secure;
subsequent to executing the first authentication process and installing a local device, executing a second authentication process between the user device and the local device, wherein the local device is an industrial Internet of Things (IIoT) device in an industrial system that is configured to measure industrial data, the industrial data comprising one or more of a temperature, a pressure, a fluid flow volume, a fluid flow rate, or a force, wherein the local device is one of an industrial controller, industrial monitor, or industrial data collector and wherein the industrial data is sent from the local device to the cloud;
wherein the industrial system is a power generating plant or a manufacturing operation;
receiving, from the local device via a local communication connection, a device identifier for the local device, the user device upon completion of the first authentication process being trusted by a cloud computing system for communication with the cloud computing system;
causing display, via the user interface, an indicator for the local device;
receiving, via the user interface, an activation of the indicator for the local device to initiate enrollment of the local device with the cloud computing system;
in response to the activation, issuing a request to the cloud computing system for credential information, the credential information enabling the local device to enroll with the cloud computing system, wherein the request is made via a wide area network;

in response to the request, receiving the credential information from the cloud computing system via the wide area network; and transmitting the credential information to the local device via the local communication connection;

wherein the user interface is configured to render indications of currently provisioned local devices, currently unprovisioned local devices, and available operational roles for the unprovisioned local devices, wherein the available operational roles are represented by particular locations or elements in a representation of an industrial system or environment.

19. A local device comprising:

one or more hardware processors; and a memory storing instructions that, when executed by at least one of the one or more hardware processors, cause the local device to perform operations comprising:

executing a first authentication process between a cloud computing system and a separate device such that subsequent communications between the cloud computing system and the separate device are secure;

subsequent to executing the first authentication process and installing a local device, executing a second authentication process between the separate device and the local device;

transmitting a device identifier for the local device to the separate device via a local communication connection, the separate device upon completion of the first authentication process being trusted by a cloud computing system for communication with the cloud computing system;

wherein the separate device obtains credential information from the cloud using the identifier;

receiving, from the separate device via the local communication connection, after the transmitting of the device identifier for the local device, the credential information for the local device from the separate device, the credential information enabling enrollment of the local device with the cloud computing system; and transmitting, to the cloud computing system via the wide area network, a request to enroll the local device with the cloud computing system using the credential information wherein the local device is an industrial Internet of Things (IIoT) device in an industrial system that is configured to measure industrial data, the industrial data comprising one or more of a temperature, a pressure, a fluid flow volume, a fluid flow rate, or a force;

wherein the industrial system is a power generating plant or a manufacturing operation;

wherein the industrial data is sent from the local device to the cloud;

wherein a user interface at the separate device is configured to render indications of currently provisioned local devices, currently unprovisioned local devices; and available operational roles for the unprovisioned local devices, wherein the available operational roles are represented by particular locations or elements in a representation of an industrial system or environments;

wherein the local device is one of an industrial controller, industrial monitor, or industrial data collector.

* * * * *